US010592135B2

(12) United States Patent
Litke et al.

(10) Patent No.: US 10,592,135 B2
(45) Date of Patent: *Mar. 17, 2020

(54) PEER TO PEER VOLUME EXTENSION IN A SHARED STORAGE ENVIRONMENT

(71) Applicant: RED HAT, INC., Raleigh, NC (US)

(72) Inventors: Adam Litke, Bethel Park, PA (US); Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,010

(22) Filed: May 14, 2018

(65) Prior Publication Data

US 2019/0146686 A1 May 16, 2019

Related U.S. Application Data

(63) Continuation of application No. 14/633,081, filed on Feb. 26, 2015, now Pat. No. 9,971,525.

(51) Int. Cl.
*G06F 3/06* (2006.01)
*G06F 11/14* (2006.01)
(Continued)

(52) U.S. Cl.
CPC ............ *G06F 3/0619* (2013.01); *G06F 3/067* (2013.01); *G06F 3/0608* (2013.01); *G06F 3/0652* (2013.01); *G06F 3/0653* (2013.01); *G06F 3/0665* (2013.01); *G06F 3/0689* (2013.01); *G06F 11/14* (2013.01); *G06F 11/1448* (2013.01); *G06F 11/1458* (2013.01); *G06F 11/3034* (2013.01); *G06F 11/004* (2013.01); *G06F 2201/81* (2013.01); *G06F 2201/84* (2013.01); *G06F 2201/875* (2013.01)

(58) Field of Classification Search
CPC .... G06F 3/0619; G06F 3/0608; G06F 3/0652; G06F 3/0653; G06F 3/0665; G06F 3/067; G06F 3/0689
See application file for complete search history.

(56) References Cited

U.S. PATENT DOCUMENTS 7,328,325 B1 2/2008 Solis et al.
7,818,515 B1 10/2010 Umbehocker et al.
(Continued)

OTHER PUBLICATIONS

Andre Brinkman, Snapshots and Continuous Data Replication in Cluster Storage Environments, IEEE, 2007 (Year: 2007).*
(Continued)

*Primary Examiner* — Khoa D Doan
(74) *Attorney, Agent, or Firm* — Lowenstein Sandler LLP

(57) ABSTRACT

A storage manager may initiate a merge operation for a set of writable storage volumes. The storage manager may receive, from a management server, an indication that an allocated disk space of at least one storage volume of the set of writable storage volumes is to be extended, where the at least one storage volume has exceeded a storage threshold during the merge operation. The allocated disk space of the at least one storage volume of the set of writable storage volumes may be extended in response to the received indication. The management server may be notified that the allocated disk space of the at least one storage volume has been extended upon extending the allocated disk space.

20 Claims, 4 Drawing Sheets

(51) Int. Cl.
*G06F 11/30* (2006.01)
*G06F 11/00* (2006.01)

(56) References Cited

U.S. PATENT DOCUMENTS

| | | | |
|---|---|---|---|
| 8,171,201 | B1 | 5/2012 | Edwards, Sr. |
| 8,407,436 | B2 | 3/2013 | Arakawa |
| 8,732,139 | B2* | 5/2014 | Schreter ............ G06F 16/2272 |
| | | | 707/696 |
| 8,904,136 | B2* | 12/2014 | Sobel .................. G06F 3/0608 |
| | | | 711/165 |
| 9,092,376 | B1 | 7/2015 | Chelur et al. |
| 9,229,849 | B2 | 1/2016 | Yang et al. |
| 9,317,313 | B2 | 4/2016 | Srinivasan |
| 9,460,028 | B1 | 10/2016 | Raizen et al. |
| 9,733,835 | B2 | 8/2017 | Lin |
| 9,830,193 | B1* | 11/2017 | Wagner ................. G06F 9/5077 |
| 2004/0260869 | A1 | 12/2004 | Factor et al. |
| 2005/0108485 | A1* | 5/2005 | Perego ................. G06F 3/0607 |
| | | | 711/162 |
| 2005/0166011 | A1* | 7/2005 | Burnett ............... G06F 3/0605 |
| | | | 711/112 |
| 2006/0136691 | A1 | 6/2006 | Brown et al. |
| 2007/0143546 | A1* | 6/2007 | Narad ................. G06F 12/084 |
| | | | 711/130 |
| 2007/0174669 | A1 | 7/2007 | Ebata et al. |
| 2008/0005507 | A1 | 1/2008 | Madnani et al. |
| 2008/0086616 | A1 | 4/2008 | Asano et al. |
| 2009/0055593 | A1 | 2/2009 | Satoyama et al. |
| 2009/0319735 | A1 | 12/2009 | Agombar et al. |
| 2012/0005449 | A1* | 1/2012 | Reed .................... G06F 3/0607 |
| | | | 711/171 |
| 2012/0042141 | A1 | 2/2012 | Tatara et al. |
| 2013/0297905 | A1 | 11/2013 | Yang et al. |
| 2014/0075143 | A1 | 3/2014 | Matsuya et al. |
| 2014/0149983 | A1 | 5/2014 | Bonilla et al. |
| 2014/0189682 | A1 | 7/2014 | Crudele et al. |
| 2014/0223130 | A1* | 8/2014 | Dudgeon ............. G06F 12/023 |
| | | | 711/165 |
| 2014/0281307 | A1 | 9/2014 | Peterson et al. |
| 2015/0032699 | A1 | 1/2015 | Fujita et al. |
| 2016/0103738 | A1 | 4/2016 | Forgette et al. |
| 2016/0103739 | A1 | 4/2016 | Huang et al. |
| 2016/0127200 | A1* | 5/2016 | Dippenaar ............. G06F 16/11 |
| | | | 709/224 |
| 2016/0224259 | A1 | 8/2016 | Ahrens et al. |
| 2016/0246683 | A1 | 8/2016 | Vijayan et al. |
| 2016/0253109 | A1 | 9/2016 | Litke et al. |
| 2016/0335278 | A1 | 11/2016 | Tabaaloute et al. |

OTHER PUBLICATIONS

Simon Chong, Paul A. Watters, Michael Hitchens, Automated Physical Storage Provision Using a Peer-to-Peer Distributed File System, 21st International Conference on Data Engineering Workshops (ICDEW'05) (p. 1214) (Year: 2005).*

* cited by examiner

PEER TO PEER VOLUME EXTENSION IN A SHARED STORAGE ENVIRONMENT

CROSS-REFERENCE TO RELATED APPLICATIONS

This patent application is a continuation of U.S. Non-Provisional application Ser. No. 14/633,081, filed Feb. 26, 2015, entitled "PEER TO PEER VOLUME EXTENSION IN A SHARED STORAGE ENVIRONMENT" which is incorporated herein by reference for all purposes.

TECHNICAL FIELD

Embodiments of the present disclosure relate to virtual machines and, more specifically, to a peer to peer volume extension in a shared storage environment.

BACKGROUND

A virtual machine (VM) may be a software-based emulation of computer hardware. For example, the VM may operate based on computer architecture and functions of computer hardware resources associated with hard disks or other such memory. A virtual disk that emulates a hard disk or memory may be used by the VM. Thus, the VM may emulate a physical computing environment, and requests for a hard disk or memory may be managed by a virtualization layer which translates these requests to the underlying physical computing hardware resources. The virtualization layer may be part of a virtual machine management application that manages the virtual disk.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
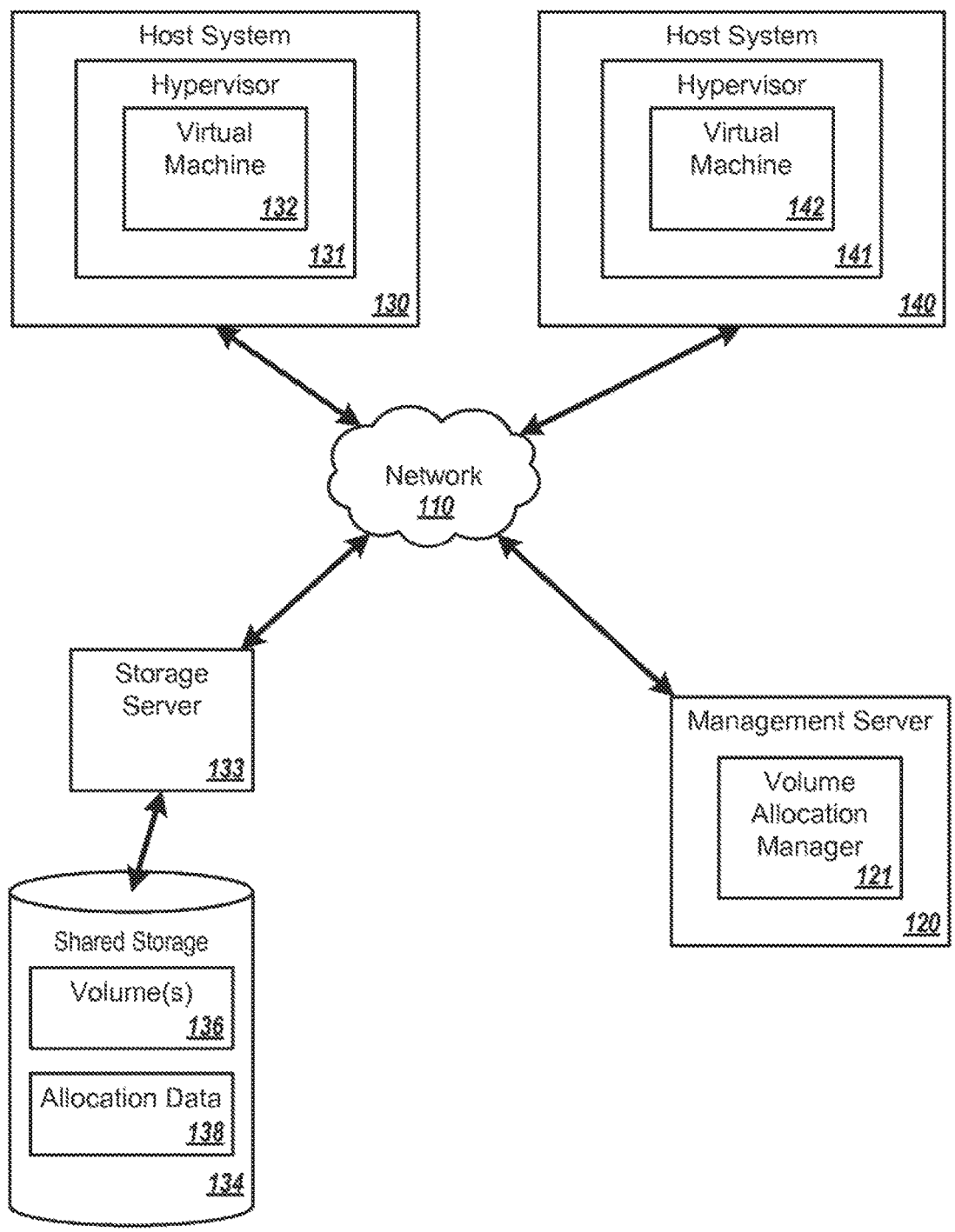
FIG. 1 illustrates an example system architecture in which embodiments of the disclosure may operate.

Aspects of the present disclosure relate to peer to peer volume extension in a shared storage environment. The volume may be associated with a virtual machine. The virtual machine (VM) may be based on a virtual disk (also referred to as a virtual disk image) that is based on a series of snapshots. A snapshot may refer to a copy of the virtual disk at a particular point in time. For example, when a change is made to the virtual disk after the snapshot has been created, the snapshot may include a copy of the changed area of the virtual disk as it was prior to the change so that a prior state of the virtual disk may be reconstructed (e.g., by discarding only the changes made after the snapshot was created).

The virtual disk may be based on a series of volumes associated with snapshots. Each snapshot and the contents of the original virtual disk may each be stored on separate volumes and the virtual disk may be based on the series or chain of the volumes. Such a series of snapshots and the original virtual disk may also be referred to as the volume chain. For example, a first snapshot may be created based on the virtual disk and subsequent changes to the virtual disk may be recorded in a new volume associated with the first snapshot. A second snapshot may be based on the first snapshot and subsequent changes to the first snapshot may then be recorded in a second new volume associated with the second snapshot. Further, a third snapshot may then be based on the second snapshot and subsequent changes to the second snapshot may be saved in a third new volume associated with the third snapshot. Thus, the virtual disk may based on a series of the original virtual disk, the first volume with the first snapshot, the second volume with the second snapshot, and the third volume with the third snapshot. The final or last volume of the chain may be used to store current changes that are made to the virtual disk by the virtual machine since the last snapshot was created. The last volume may be referred to as the active volume.

When a virtual machine is instantiated, a disk size may be defined. For example, a 100 gigabyte (GB) disk size may be defined for the virtual machine. Initially, a portion of the disk size may be allocated to a storage volume that is used by the virtual machine. Such a storage volume that uses less than the full amount of allocated storage may be referred to as a thin provisioned volume. A thin provisioned volume has a minimal amount of allocated disk space and can have unallocated disk space. For example, 10 GB may be allocated to the thin provisioned volume even though the disk size is 100 GB. Additional disk space may be allocated to the thin provisioned volume up to the amount of the disk size. Storage volumes can be thinly provisioned to preserve physical storage resources. Each volume in the volume chain may be a thin provisioned volume.

A merge operation may be performed on the virtual disk. In some embodiments, a live merge operation may refer to an operation performed on a virtual disk to change the series of volumes of the virtual disk as a virtual machine is writing or creating changes to the active volume of the virtual disk. For example, as previously described, the virtual disk may be based on a volume chain. A live merge operation may merge or combine data from two of the volumes in the volume chain. For example, data from the final volume of the series of volumes (e.g., a source volume) may be merged into the previous volume of the series of volumes (e.g., a destination volume). The source volume is a child to the destination volume. The merging or combining of the volumes may result in the adding of the changed data that has been recorded in the child volume to the parent volume as well as current changes made by the VM to the virtual disk being saved in the parent volume as opposed to being saved in the child volume of the volume chain. The merge operation may be performed by a host machine that includes a virtual machine that uses the virtual disk. Using peer-to-peer architecture can leverage a peer machine during the merge operation. For example, a peer machine, such as a storage server, can monitor writable volumes during the merge operation to help ensure the merge operation is successful. After the merge operation is complete, a storage server may perform cleanup operations to remove the child volume from the shared storage. In some embodiments, the host machine and the storage server may be referred to as peers. In some embodiments, a snapshot is a chain of copy-on-write (COW) volumes and removing the snapshot includes replacing a corresponding sub-chain with a single volume (thus losing the history of changes but freeing-up some physical disk space).

In some cases, a merger of the source volume into a thin provisioned destination volume may cause the destination volume to exceed its allocated size. In such instances, the merge operation typically fails because the destination volume does not have sufficient space to store the data from the source volume.

Aspects of the present disclosure may prevent the failure of a merge operation by extending the volume allocation of the thin provisioned destination volume during the merge operation. For example, the volume allocation manager may monitor the destination and source volumes before and during the merge operation to determine whether to extend the destination volume for a successful merge operation.

FIG. 1 is an example system architecture 100 for various implementations of the disclosure. The system architecture 100 may include host systems 130 and 140 coupled to one or more storage servers 133 via a network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

The host systems 130 and 140 may each include a hypervisor (e.g., hypervisors 131 or 141) that are each associated with a virtual machine (e.g., virtual machine 132 and virtual machine 142). The host systems 130 or 140 may include, but are not limited to, desktop computers, laptop computers, rackmount servers, routers, switches, tablet computers, mobile phones, or any other type of computing device. The host systems 130 and 140 may include hardware resources that may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

The hardware resources of a host system may provide one or more services such as, but not limited to, networking services, storage services, and software libraries. In some embodiments, the hypervisor (e.g., hypervisor 131 or 141), also referred to as a virtual machine monitor (VMM) and/or a virtual machine (e.g., virtual machine 132 or 142) may use the one or more services that are provided by the host system. The hypervisors 131 or 141 is an application that executes on a host system 130 or 140 to manage virtual machines 132 or 142. In particular, the hypervisor may instantiate or start, migrate, pause, or perform another type of event associated with virtual machines 132 and 142. For example, the hypervisor 131 or 141 may perform a live merge operation for a virtual disk used by the virtual machine 132 or 142. In some embodiments, the hypervisor 131 or 141 may further coordinate metadata changes in the system architecture 100, such as creating and deleting virtual disk images, identifying relationships (e.g., parent, child) between snapshots and/or storage volumes, creating and merging snapshots within a volume chain 136, extending thin provisioned volumes, and copying images between storage domains. In some embodiments, the hypervisor 131 or 141 may update metadata 138 for one or more volumes in a volume chain identified in a virtual disk image file that is stored at a shared storage 134. The shared storage 134 can include any number of storage devices that can be used by any number of hosts (e.g., hosts 130, 140).

As shown in FIG. 1, the system architecture 100 may further include a management server 120. In some embodiments, the management server 120 may manage the use of the hardware resources of the host systems 130 and 140 as well as aspects of the storage servers 133 and the corresponding server storage device 134. The management server 120 may include a volume allocation manager 121 that may coordinate a merge operation for volumes 136 of a virtual disk in the shared storage 134.

Each of the hypervisor 131, 141 and the management server 120 may create and modify data that identifies disk allocation amounts for the series of volumes upon which a virtual disk is based. For example, the hypervisor 131, 141 may manage the disk allocation amounts for each volume in the volume chain of the virtual disk. Such data managed by the hypervisor 131, 141 may be referred to as allocation data 138 of the virtual disk. Each of the hypervisor 131, 141 and the storage server 133 may update the allocation data 138 of the series of volumes of the virtual disk in response to receiving an instruction from the volume allocation manager 121 to change the allocation amount for a given volume.

In operation, the management server 120 may receive a request to delete a snapshot that is associated with either a destination volume of a virtual disk used by the virtual machine 132 running on host 130 or a source volume of the virtual disk. The volume allocation manager 121 may instruct the hypervisor 131 to perform a live merge operation to merge the source volume into the destination volume of the virtual disk. The destination volume may be a parent of the source volume.

Before and/or during the live merge operation, the volume allocation manager 121 can monitor any writable volumes to determine if the volume(s) are candidates for volume extension. The writable volumes may include, for example, the destination volume and the active volume. To monitor the writable volumes, the volume allocation manager 121 can periodically determine the current storage allocation for the volume being written to and compare it against the amount of data to be written to the volume. In an example, for some types of storage formats (e.g., qcow), writes are performed on the lowest available block at the lowest possible offset. Data may be written to the volume until the volume is full (e.g., the amount of data written to the volume is approximately the same size as the actual amount of storage space allocated to the volume). The highest offset where the last allocated block resides in a storage device is sometimes referred to as a "high-write watermark." The high-write watermark may be stored in the shared storage 134. To determine the current storage allocation for the volume, the volume allocation manager 121 can access the high-write watermark for the volume in the shared storage 134. The volume allocation manager 121 can compare the current amount of data written to the volume against the high-write watermark for the volume. In some embodiments, the volume allocation manager 121 calculates a ratio between the current amount of data written to the volume and the high-write watermark for the volume. When the ratio meets a threshold amount (e.g., above 80%), the volume allocation manager 121 can determine that the volume is an extension candidate. The volume allocation manager 121 then checks whether the volume is thinly provisioned, (e.g., whether the volume can be extended). If the volume is thinly provisioned, then the volume allocation manager 121 can extend the volume. The volume allocation manager 121 can extend the volume by any amount. The volume allocation manager 121 can simultaneously extend any number of volumes during the merge operation.

To extend the volume, the volume allocation manager 121 can send parameters to instruct the shared storage 134 to update the metadata for the volume to a new size. The shared storage 134 can validate that the volume can be extended within the parameters received from the volume allocation manager 121. For example, the shared storage 134 can check whether extended the volume per the parameters would exceed a maximum volume size. The shared storage 134 can perform the extension, after which it can notify the volume allocation manager 121 that the volume has been extended. For embodiments that use a high-write watermark, the shared storage 134 can update the high-write watermark to indicate the new size of the volume after the extension.

In some embodiments, the volume allocation manager 121 can check whether the shared storage 134 performed the extension per the sent parameters. To do so, the volume allocation manager 121 can refresh a connection to the shared storage 134, and determine whether the size of the volume is correct. In some embodiments, the volume allocation manager 121 can access the high-write watermark in the shared storage. If the size of the volume matches the expected size, the volume allocation manager 121 can determine that that volume was extended properly. With the extended volume, the merge operation continues to proceed until it is complete. Upon completing the merge operation, the hypervisor 131 or 141 may send a notification to the volume allocation manager 121 that the merge operation is complete.

In some embodiments, data is written to a volume that is an extension candidate faster than the volume can be extended. In such embodiments, the component that is writing to the volume (e.g., the virtual machine) can receive an error and can be paused until the volume is extended. Once the volume is extended, the volume allocation manager 121 can send a message to the component to resume writing to the volume.

Figure 2A:
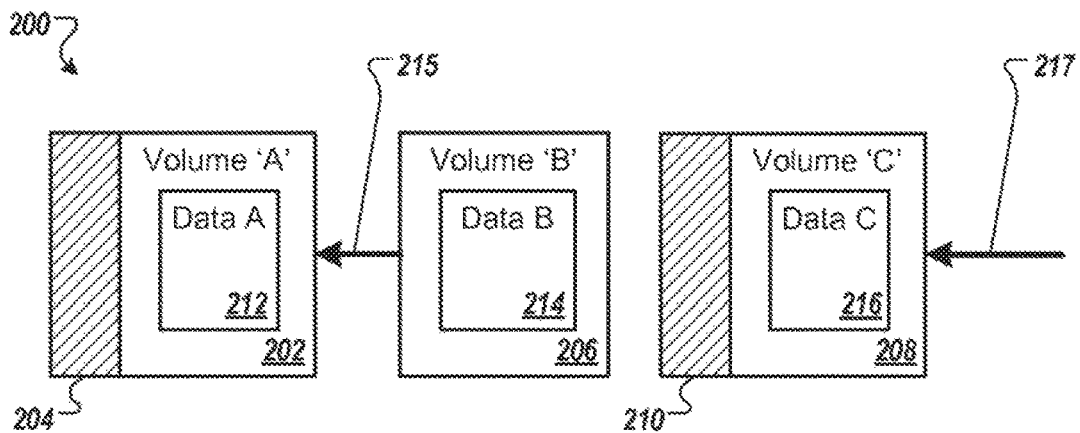
FIGS. 2A-C illustrate example sets of writable volumes A, B, C that can be candidates for volume extension in accordance with some embodiments.
Figure 2B:
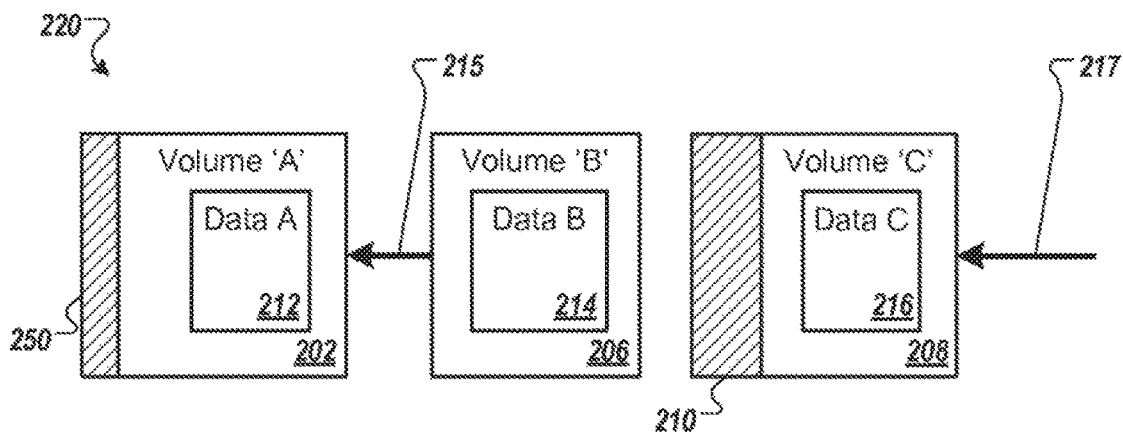
Figure 2C:
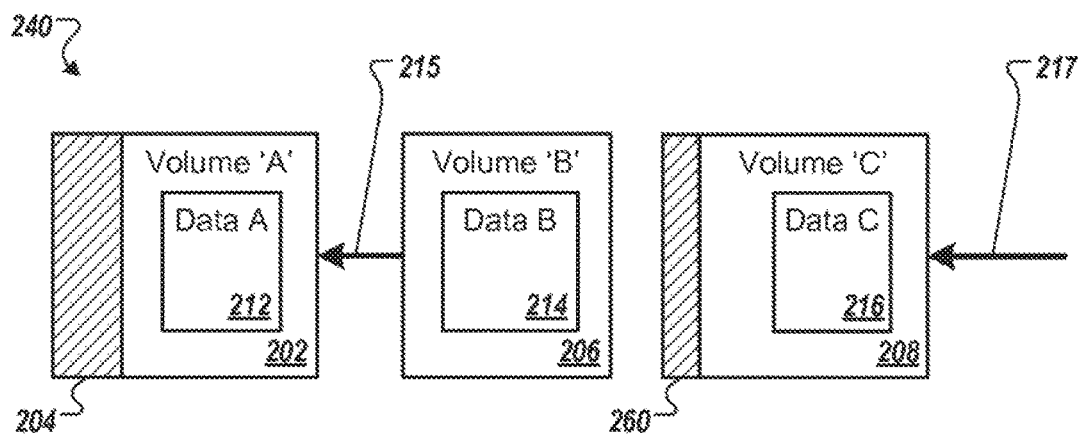

FIGS. 2A-C illustrate example sets of writable volumes A, B, C that can be candidates for volume extension in accordance with some embodiments. Volume A 202, volume B 206 and volume C 208 can be volumes in a volume chain. Volume A 202 stores data A 212, volume B stores data B 214, and volume C 208 stores data C 216. The data 212, 214, 216 stored on the volumes 202, 206, 208 can be any kind or type of data. In some embodiments, the data 212, 214, 216 stored on the volumes 202, 206, 208 are associated with respective snapshots. A merge operation to copy the data B 214 from volume B 206 to volume A 202 can be running, which is represented by the arrow 215. Because data B 214 is writing to volume A 202 as part of the merge operation, volume A 202 may be referred to as a writable volume. Volume C 208 can be an active because it can be written to by a device, such as a virtual machine. The writing of data to volume C 208 is represented by arrow 217. Volume C may also be referred to a writable volume. Both volume A 202 and volume C 208 can be written to during a live merge operation—volume A 202 as part of the live merge operation and volume C 208 can be written to during typical usage of a virtual machine, for example.

As illustrated in FIG. 2A, the set of writable volumes 200 includes two thinly provisioned volumes (volume A 202 and volume C 208). Volume A 202 includes authorized but unallocated disk space 204. Similarly, volume C 208 includes authorized but unallocated disk space 210. During the live merge operation 215, a volume allocation manager (such as the volume allocation manager of FIG. 1) can facilitate a volume extension operation, as described herein. For example, the size of volume A 202 may be insufficient to hold both data A 212 and data B 214. Thus, the volume allocation manager can cause volume A to be extended by using some of the unallocated disk space 204. Thus, FIG. 2B represents the volume chain 220 after volume A 202 has been extended during the live merge operation 215. There is now less unallocated disk space 250 available to volume A 202.

During the live merge operation, it can also be determined that a different writable volume is to be extended. As illustrated in FIG. 2C, volume C 206 has been extended by using some of the unallocated disk space 206. There is now less unallocated disk space 260 available to volume C 208.

Figure 3:
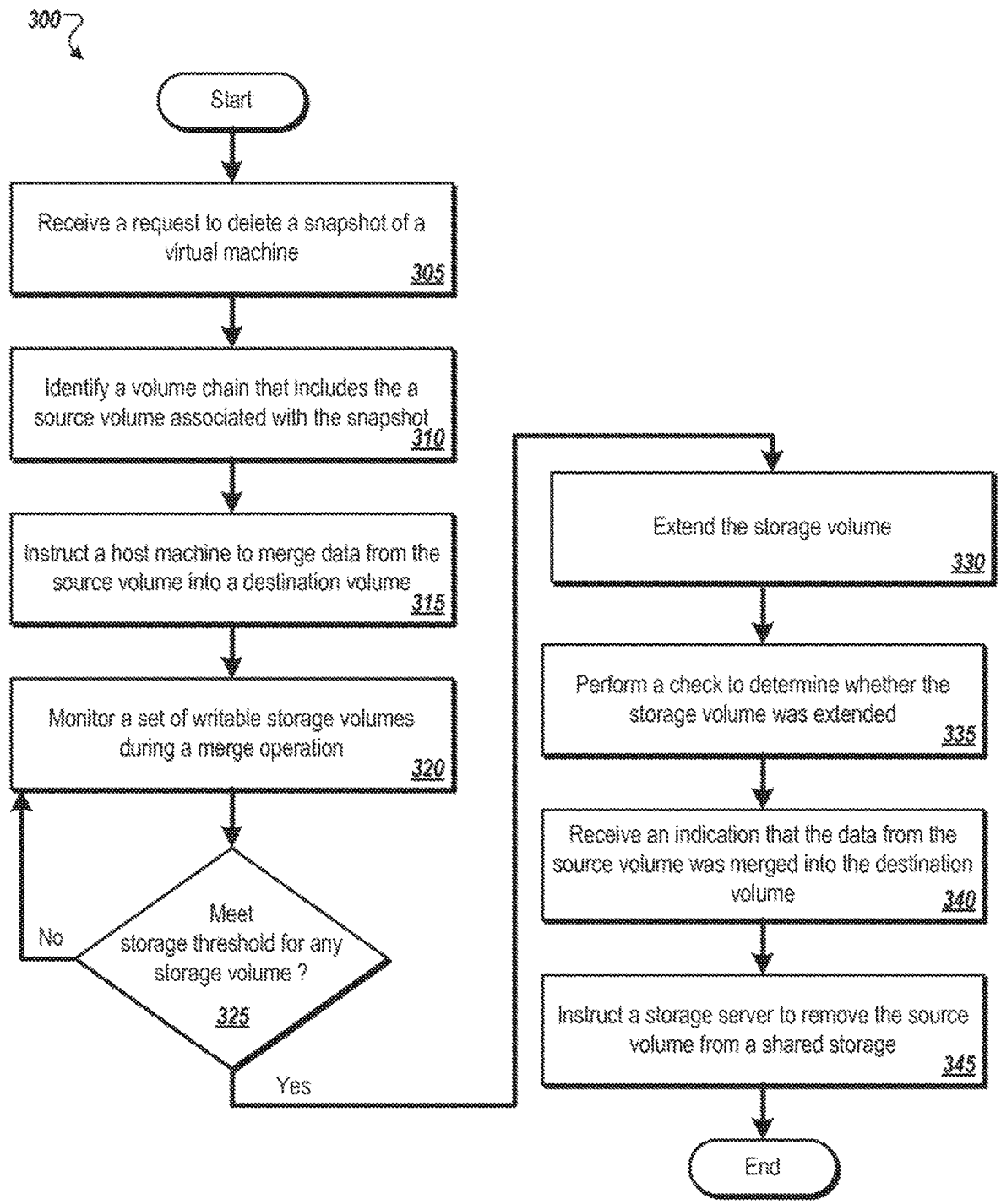
FIG. 3 is a flow diagram of an example method for peer to peer volume extension in a shared storage environment in accordance with some embodiments.

FIG. 3 illustrates a flow diagram of an example method 300 for peer to peer volume extension in a shared storage environment. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a volume allocation manager 121 of a management server 120 as described with relation to FIG. 1.

As shown, the method 300 may begin by the processing logic receiving a request to delete a snapshot at block 305. The request can be from a user or can be machine-generated, such as part of an operation to cleanup snapshots.

At block 310, the processing logic identifies a volume chain of a virtual disk in a shared storage. The shared storage may include a source storage volume and a destination storage volume. The snapshot to be deleted may be associated with the source storage volume.

At block 315, the processing logic instructs a host machine (e.g., host machine 130 of FIG. 1) to perform a merge operation to merge data of the source storage volume with data of the destination storage volume and to remove the snapshot.

At block 320, the processing logic monitors a set of writable storage volumes during the merge operation. The set of writable storage volumes can include the destination storage volume and also an active storage volume. When monitoring the set of writable storage volumes, the processing logic can identify a current volume usage for the destination storage volume. The processing logic can compare the current volume usage with a storage threshold at block 325. For example, the current volume usage of the destination storage volume can be 2.9 GB and the storage threshold can be 2.8 GB. Because the current volume usage (2.9 GB) exceeds the threshold (2.8 GB), the processing logic can extend the allocated disk space of the storage volume at block 330. In some embodiments, when extending the storage volume, the processing logic can instruct a storage manager (such as the storage server 133 of FIG. 1) to extend the allocated disk space of the storage volume in a shared storage (such as the shared storage 134 of FIG. 1). The processing logic can receive an indication from the storage manager that the storage volume has been extended.

At block 335, the processing logic can perform a check to determine whether the storage volume was extended. For example, the processing logic can refresh a data connection with the storage. Upon refreshing, the processing logic can identify parameters of the storage volume, where one of the parameters is the allocated size. The processing logic can compare the parameter with the expected size. When the expected size and parameter of the storage volume match, then the processing logic can determine that the storage volume was extended.

Once the host machine has completed the merge operation and has unlinked the source volume from the volume chain, the host machine can send a notification that the merge operation is complete.

At block 340, the processing logic receives an indication from the host machine (e.g., the notification) that the data of the source storage volume has been merged into the data of the destination storage volume. At block 345, the processing logic instructs a storage server to remove the source storage volume from the shared storage in response to determining that the data of the source storage volume has been merged into the data of the destination storage volume and that the source storage volume was unlinked from the volume chain.

Figure 4:
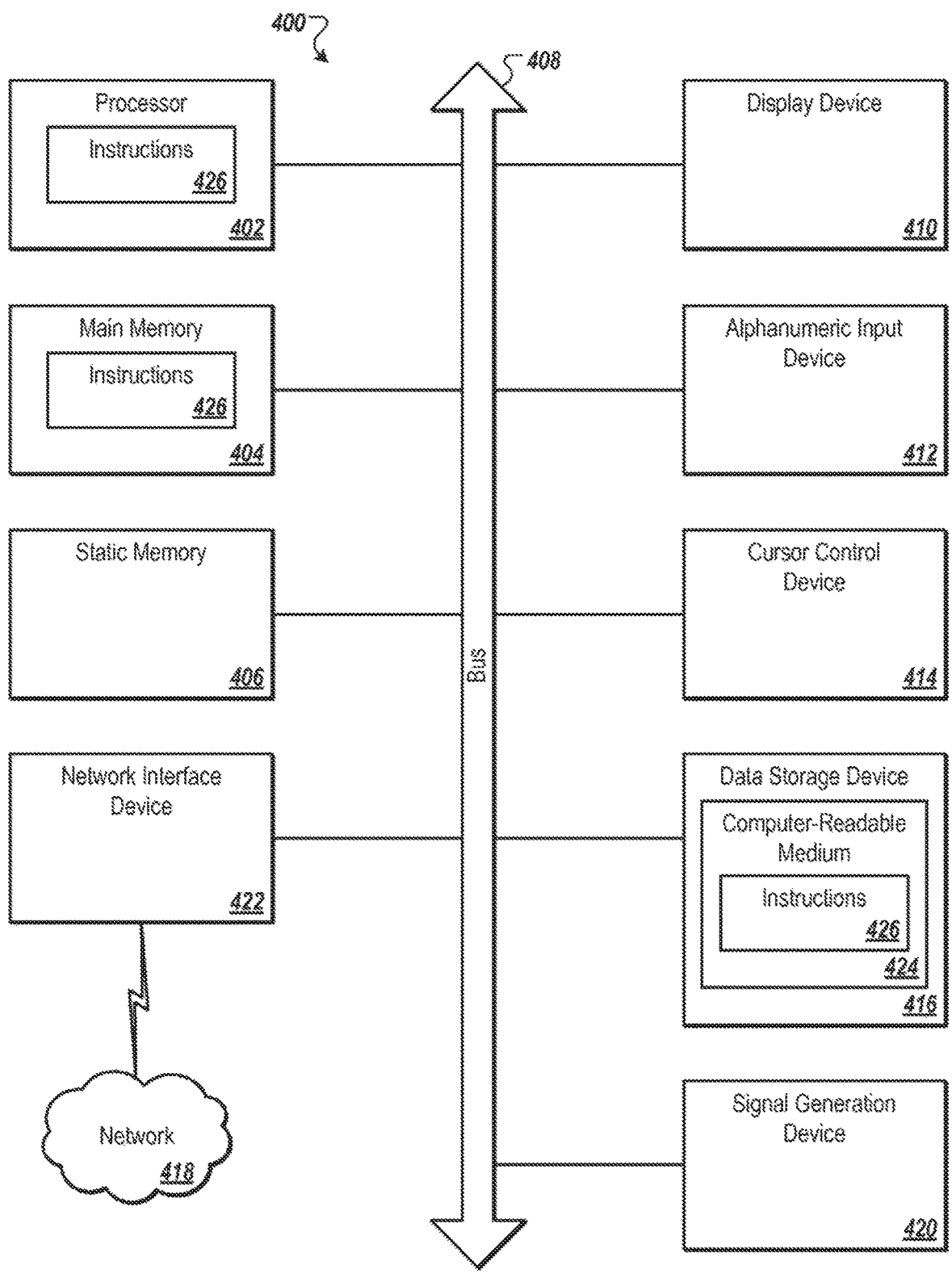
FIG. 4 illustrates a block diagram of an embodiment of a computer system in which some embodiments of the disclosure may operate.

FIG. 4 illustrates a diagrammatic representation of a machine in the example form of a computer system 400 within which a set of instructions, for causing the machine to perform any one or more of the methodologies discussed herein, may be executed. The computer system 400 may correspond to the management server 120 or host system 130, 140 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include one or more network interface devices 422 (e.g., NICs). The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., volume allocation manager 121). The instructions 454 may also reside, completely or at least partially, within the main memory 404 and/or within the processing device 402 during execution thereof by the computer system 400; the main memory 404 and the processing device 402 also constituting machine-readable storage media.

While the computer-readable storage medium 424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    initiating, by a processing device of a storage manager, a merge operation for a set of writable storage volumes;
    receiving, by the processing device of the storage manager from a management server connected to the storage manager via a network, an indication that an allocated disk space of at least one storage volume of the set of writable storage volumes is to be extended, wherein the at least one storage volume has exceeded a storage threshold during the merge operation;
    in response to receiving the indication, extending, by the processing device of the storage manager, the allocated disk space of the at least one storage volume of the set of writable storage volumes; and
    upon extending the allocated disk space of the at least one storage volume, notifying, by the processing device of the storage manager, the management server that the allocated disk space of the at least one storage volume has been extended.

2. The method of claim 1, further comprising:
    receiving, by the processing device of the storage manager from the management server, an instruction to remove a source storage volume associated with the merge operation from the set of writable storage volumes; and
    in response to receiving the instruction, removing the source storage volume from the set of writable storage volumes.

3. The method of claim 2, wherein the instruction to remove the source storage volume associated with the merge operation from the set of writable storage volumes is received upon completion of the merge operation for the set of writable storage volumes.

4. The method of claim 1, wherein the merge operation is performed while a virtual machine writes new data to an active volume of a virtual disk.

5. The method of claim 4, wherein the set of writable storage volumes comprises the active volume, wherein the extending of the allocated disk space is performed on the active volume during the merge operation.

6. The method of claim 1, wherein the set of writable storage volumes are a part of a volume chain that comprises a series of snapshots associated with a virtual disk.

7. The method of claim 1, wherein extending the allocated disk space of the at least one storage volume of the set of writable storage volumes is performed during the merge operation.

8. A system comprising:
    a memory; and
    a processing device of a storage manager operatively coupled with the memory to:
        initiate a merge operation for a set of writable storage volumes;
        receive from a management server connected to the storage manager via a network, an indication that an allocated disk space of at least one storage volume of the set of writable storage volumes is to be extended, wherein the at least one storage volume has exceeded a storage threshold during the merge operation;
        in response to receiving the indication, extend the allocated disk space of the at least one storage volume of the set of writable storage volumes; and
        upon extending the allocated disk space of the at least one storage volume, notify the management server that the allocated disk space of the at least one storage volume has been extended.

9. The system of claim 8, wherein the processing device is further to:
    receive, from the management server, an instruction to remove a source storage volume associated with the merge operation from the set of writable storage volumes; and
    in response to receiving the instruction, remove the source storage volume from the set of writable storage volumes.

10. The system of claim 9, wherein the instruction to remove the source storage volume associated with the merge operation from the set of writable storage volumes is received upon completion of the merge operation for the set of writable storage volumes.

11. The system of claim 8, wherein the merge operation is performed while a virtual machine writes new data to an active volume of a virtual disk.

12. The system of claim 11, wherein the set of writable storage volumes comprises the active volume, wherein the extending of the allocated disk space is performed on the active volume during the merge operation.

13. The system of claim 8, wherein the set of writable storage volumes are a part of a volume chain that comprises a series of snapshots associated with a virtual disk.

14. The system of claim 8, wherein to extend the allocated disk space of the at least one storage volume of the set of writable storage volumes is performed during the merge operation.

15. A non-transitory machine-readable storage medium including instructions that, when executed by a processing device of a storage manager, cause the processing device to:
    initiate a merge operation for a set of writable storage volumes;
    receive, from a management server connected to the storage manager via a network, an indication that an allocated disk space of at least one storage volume of the set of writable storage volumes is to be extended, wherein the at least one storage volume has exceeded a storage threshold during the merge operation;
    in response to the received indication, extend the allocated disk space of the at least one storage volume of the set of writable storage volumes; and
    upon extending the allocated disk space of the at least one storage volume, notify the management server that the allocated disk space of the at least one storage volume has been extended.

16. The non-transitory machine-readable storage medium of claim 15, wherein the processing device is further to:
    receive, from the management server, an instruction to remove a source storage volume associated with the merge operation from the set of writable storage volumes; and
    in response to receiving the instruction, remove the source storage volume from the set of writable storage volumes.

17. The non-transitory machine-readable storage medium of claim 16, wherein the instruction to remove the source storage volume associated with the merge operation from the set of writable storage volumes is received upon completion of the merge operation for the set of writable storage volumes.

18. The non-transitory machine-readable storage medium of claim 15, wherein the merge operation is performed while a virtual machine writes new data to an active volume of a virtual disk.

19. The non-transitory machine-readable storage medium of claim 18, wherein the set of writable storage volumes comprises the active volume, wherein the extending of the allocated disk space is performed on the active volume during the merge operation.

20. The non-transitory machine-readable storage medium of claim 15, wherein to extend the allocated disk space of the at least one storage volume of the set of writable storage volumes is performed during the merge operation.

* * * * *